May 7, 1963
R. THOMPSON
3,088,263
CROP PROCESSING MACHINE
Filed April 6, 1961
3 Sheets-Sheet 3
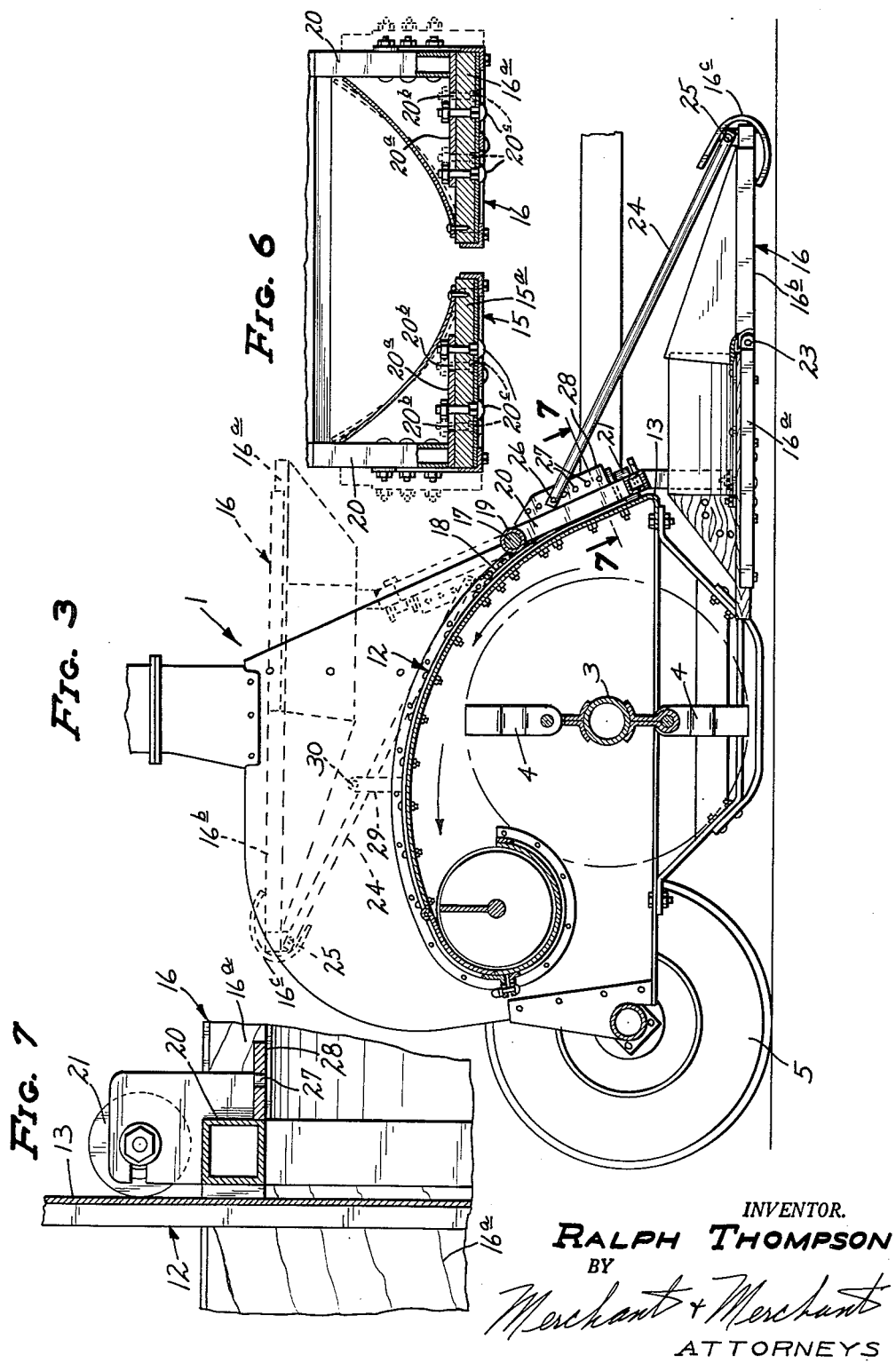
INVENTOR.
RALPH THOMPSON
BY
Merchant + Merchant
ATTORNEYS

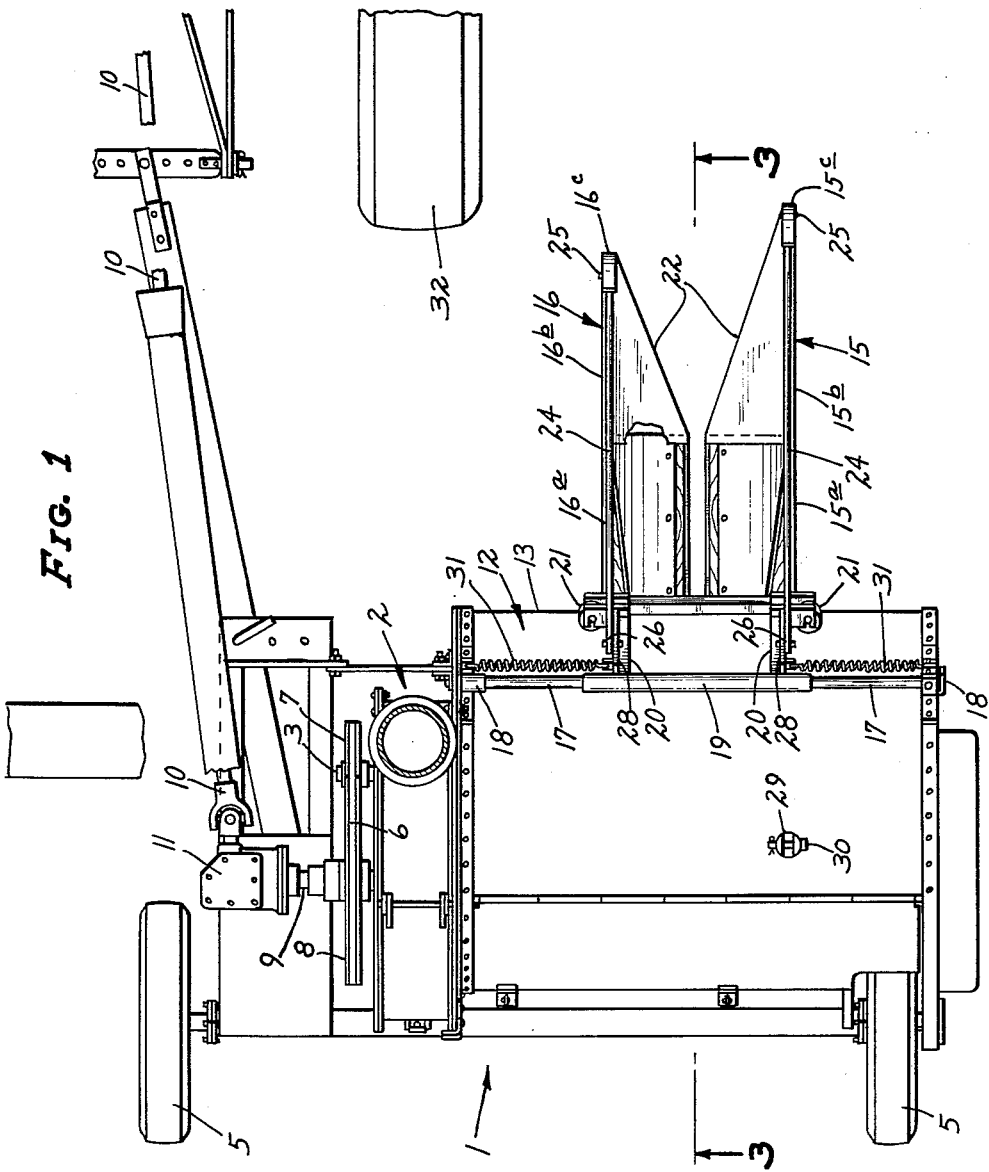
INVENTOR.
RALPH THOMPSON

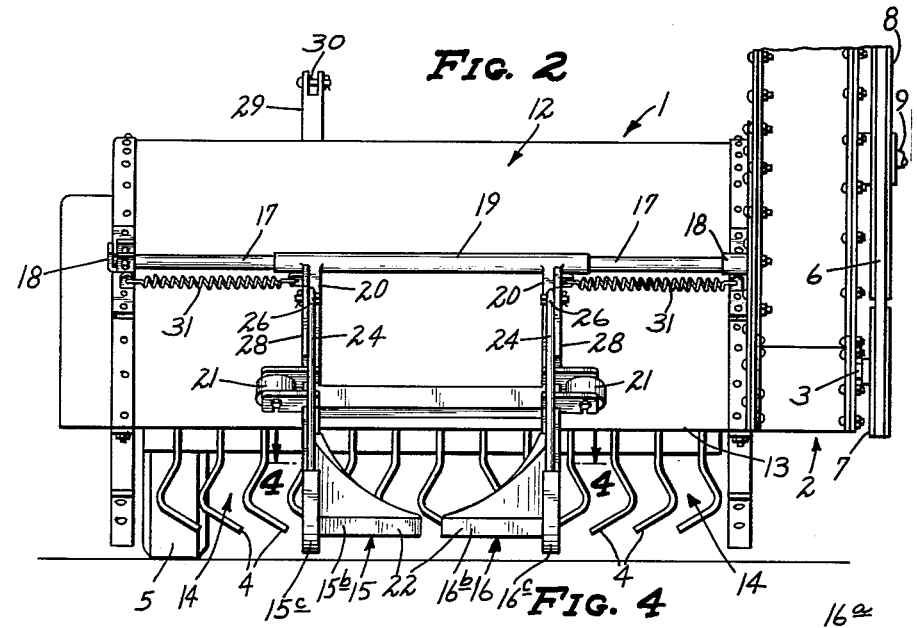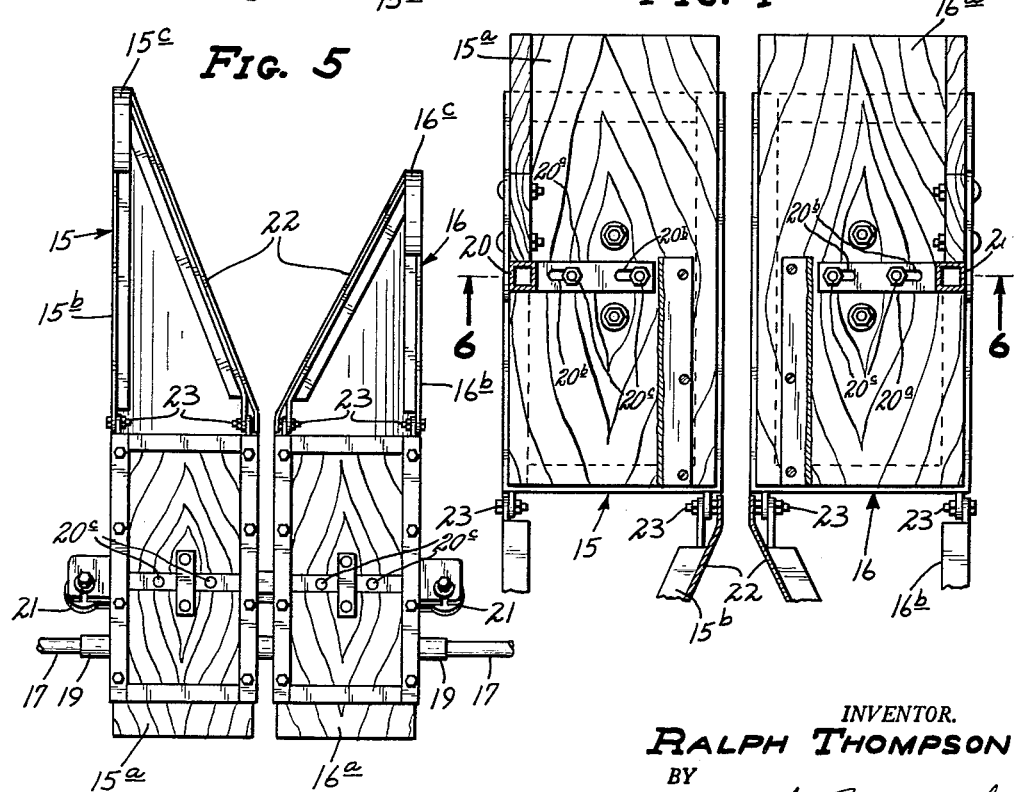

United States Patent Office 3,088,263
Patented May 7, 1963

3,088,263
CROP PROCESSING MACHINE
Ralph Thompson, Rte. 1, Whitehall, Wis.
Filed Apr. 6, 1961, Ser. No. 101,293
3 Claims. (Cl. 56—119)

My invention relates generally to row crop processing machines and more particularly to improvements in mobile chopping devices for row crops of the stalk type.

Still more particularly, my invention relates to improvements in mobile stalk choppers of the type which include a rotary stalk chopping mechanism housed in a transversely elongated cross-sectionally arcuate hood, the forward edge of said hood defining a mouth for entrance of stalks of the row crop to said chopping mechanism upon movement of said chopper over and down a given row. It is well known that stalk choppers of this type are relatively inefficient and ineffective as against stalks which, due to wind or weight of crop borne thereby, have been bent downwardly to a relatively flat position.

A primary object of my invention is the provision of mechanism whereby the efficiency of stalk choppers of the type in question may be greatly increased and whereby substantially all of the stalks associated with the plants in a given row may be gathered and held in a relatively upright position for chopping or processing. To this end I provide a pair of laterally spaced forwardly projecting crop gathering shoes which, when in operative positions, are closely spaced with respect to the ground and which, therefore, gather in and straighten substantially all of the stalks of each given plant in a row.

However, it is well known that it is virtually impossible to plant and maintain the plants in each row in a perfectly straight line; and, consequently, it is a further and highly important object of my invention to provide means whereby the gathering shoes will automatically shift laterally to compensate for lateral variations between the path of travel of the chopper and the line defined by the stalk plants of a row over and down which said chopper is being moved.

A further object of my invention is the provision of means whereby said crop gathering shoes may be manually swung into an inoperative position wherein they overlie and rest upon the hood, thereby permitting use of said chopper on crops other than of the stalk plant type.

A still further object of my invention is the provision of a novel type of gathering shoe comprising forwardly and rearwardly disposed sections which are pivotally secured together on horizontal axes for raising and lowering adjustments of the front end of the forward end sections to compensate for varying conditions of terrain over which the chopper is being moved.

The above and still further objects of my invention will become apparent from the following detailed specification, appended claims and attached drawings.

Referring to the drawings wherein like characters indicate like parts throughout the several views:

FIG. 1 is a view in top plan of a conventional crop chopper constructed in accordance with my invention, some parts being broken away and some parts shown in section;

FIG. 2 is a view in front elevation of the structure of FIG. 1, some parts being broken away;

FIG. 3 is an enlarged view in vertical section as seen substantially from the line 3—3 of FIG. 1;

FIG. 4 is an enlarged fragmentary view in section taken on the line 4—4 of FIG. 2;

FIG. 5 is an enlarged fragmentary view in bottom plan of the crop gathering shoes of my invention;

FIG. 6 is an enlarged view in vertical section as seen from the line 6—6 of FIG. 4; and FIG. 7 is an enlarged view in section taken on the line 7—7 of FIG. 3.

Referring with greater particularity to the drawings, the numeral 1 indicates in its entirety a conventional crop processing machine of the type known as a rotary chopper. Mounted in suitable framework, identified in its entirety by the numeral 2, is a horizontally disposed rotary shaft 3 having mounted thereon at axially spaced points conventional radially projecting crop chopping blades 4. As shown, the shaft 3 extends laterally with respect to the direction of travel of the chopper 1, wheels 5 being provided for purposes of mobility. The elements 3, 4 provide the rotary crop chopping mechanism, with which my invention is directly concerned, and rotation is imparted to the shaft 3 through the medium of a V-belt or the like 6 running over a sheave 7 on one end of the shaft 3 and a sheave 8 on the power shaft 9. Rotation is imparted to the power shaft 9 through a power take-off shaft 10 and conventional gearing, not shown, housed within a box 11 interposed between the power take-off shaft 10 and the shaft 9.

Overlying the rotary crop chopping processing mechanism 3, 4 is a transversely elongated, cross-sectionally arcuate hood 12 formed from rigid sheet steel or the like and terminating forwardly thereof, as indicated at 13, in spaced relation to the ground to define therebetween and the ground an elongated mouth 14 for the entrance of stalks or other plants into the processing or chopping mechanism 3, 4.

Up to this point I have described conventional mechanism which, as above indicated, is ineffective, or at least inefficient, when utilized to chop stalk type row crops wherein some of the stalks have been caused to assume a more or less horizontal position for one reason or another. For the purpose of gathering all of the stalks of each given plant in a row together and holding them in a relatively upright position as they are passed into the mouth 14 of the machine 1, I provide a pair of elongated crop gathering shoes 15 and 16.

As shown, the gathering shoes 15, 16 are laterally spaced apart and are carried by and suspended from the hood 12 in a manner whereby they may be simultaneously moved, by engagement of the stalks in a slightly crooked row, laterally in opposite directions from the transverse center of the mouth 14. This is accomplished through the medium of a horizontally disposed mounting shaft 17 which, as shown, is suitably mounted in brackets 18 carried by opposite sides of the hood 12. The mounting shaft 17, as shown particularly in FIG. 3, is spaced outwardly from the hood 12 and upwardly from the edge 13 forming the upper limits of the mouth 14 but is parallel to the lower edge 13 of the hood 12. Mounted for compound pivotal and lateral sliding movements in opposite directions on the intermediate portion of the shaft 17 is a tubular bearing sleeve 19 which has a pair of depending legs 20 rigidly secured thereto. Rigidly carried by the intermediate portion of the legs 20 are roller elements 21 which rest upon the upper surface of the hood 12 in overlying relationship to the lower forward edge 13 thereof, to reduce friction to a minimum. As shown particularly in FIGS. 2, 3 and 4, the lower ends of the legs 20 are secured, one each to one of the gathering shoes 15, 16, whereby said shoes 15, 16 are maintained in closely spaced relationship to the ground when in their full line operative position, as shown in FIG. 3, and project forwardly with respect to the transversely elongated mouth 14. Limited lateral adjustment of the shoes 15, 16 with respect to each other, to compensate for possible variations in widths of stalks being processed, is accomplished through the medium of laterally spaced opposed feet, each identified by 20a, and carried one each by the legs 20. As shown particularly in FIGS. 4 and 6, the feet 20a are provided with slots 20b through which project the lower end portions of nut-equipped bolts 20c, carried by the shoe sections 15a and 16a.

The shoes 15, 16 each comprise a rearwardly disposed section 15a and 16a respectively, which is rigid on a leg 20, and a forwardly disposed section 15b and 16b respectively, which have opposed inwardly converging side edges 22. As shown, the forwardly disposed shoe sections 15b, 16b are pivotally secured to the front end portions of their cooperating rearwardly disposed shoe sections 15a, 16a on common horizontal axes, as indicated at 23. This arrangement permits raising and lowering of the extreme forward ends 15c, 16c of the shoes 15, 16, as required, due to variations in the terrain over which the device is being drawn. For the purpose of locking the forward ends 15c, 16c of the shoe sections 15b, 16b in a desired adjusted position, I provide links 24 which are pivotally secured as at 25, one each to one of the forward ends 15c, 16c and having hook-acting rear ends 26 which fit into a selected one of the generally vertically spaced apertures 27 in plates 28 carried by the upper end portion of the legs 20.

The dotted lines in FIG. 3 illustrate the inoperative position to which the legs 20 and gathering shoes 15, 16 carried thereby may be swung, when it is desired to use the machine to process or chop crops other than of the stalk type. To securely lock said shoes in this inoperative position, I provide an upwardly opening bifurcated bracket 29 rigidly carried by the hood 12 and adapted to receive therein one of the rods 24. A cotter-equipped locking pin 30 is provided to complete the locking mechanism.

As shown particularly in FIGS. 1 and 2, the tubular bearing sleeve 19, the legs 20, and the gathering shoes 15, 16 carried thereby, are yieldingly biased toward a point centrally with respect to the mouth 14 through the medium of coil springs 31 interposed between opposite sides of the hood 12 and said legs 20. It should be here pointed out that the sole purpose of the relative shortness of the shoe sections 16b with respect to the shoe sections 15b is to facilitate turning of the tractor, not specifically shown, but the pertinent rear wheel of which is identified by the numeral 32.

When the chopper 1, equipped in accordance with my invention as immediately above described, is moved down and over a row of stalk type plants, the gathering shoes 15, 16, being closely spaced with respect to the ground, will gather in and hold in substantially upright position all of the stalks of each plant in a given row, while said stalks are being fed through the mouth 14 and into the chopping mechanism 3, 4. Under conditions where the plants in a given row deviate from a straight line, the gathering shoes 15, 16 will automatically shift laterally, by camming action of the laterally offset stalks upon the converging surfaces 22 of the shoe sections 15b, 16b. However, the coil springs 31 will always tend to return the shoes 15, 16 to a position central with respect to the mouth 14.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What I claim is:

1. The improvement in mobile stalk choppers of the type which includes a rotary stalk chopping mechanism, a hood overlying said chopping mechanism and spaced from the ground at its forward edge to define a mouth for entrance of stalks of a row crop to said chopping mechanism upon movement of said chopper over a given row, said improvement comprising a pair of laterally spaced forwardly diverging crop gathering shoes, means associated with said hood mounting said gathering shoes for common swinging movements on a horizontal axis between an operative position wherein said shoes project forwardly from the transverse center of said mouth with the front ends thereof in closely spaced relation to the ground and an inoperative position wherein said shoes are disposed in overlying relation to said hood, said means including structure mounting said shoes for common lateral movements as a pair when in said operative position, and means yieldingly biasing said shoes toward a point centrally of said mouth but permitting transverse movements of said shoes to compensate for lateral variations between the path of travel of said chopper and the line defined by the stalk plants of a row.

2. The improvement in mobile stalk choppers of the type which include a rotary stalk chopping mechanism, a transversely elongated cross-sectionally arcuate hood overlying said chopping mechanism and spaced from the ground at its forward edge to define a mouth for entrance of stalks of a row crop to said mechanism upon movement of said chopper over a given row, said improvement comprising a pair of laterally spaced forwardly diverging crop gathering shoes, means on said hood mounting said gathering shoes for common movements between an operative position wherein said shoes project forwardly from the transverse center of said mouth with the front ends thereof in closely spaced relation to the ground and in inoperative position wherein said shoes are disposed in overlying relationship to said hood and are supported thereby, said means also mounting said shoes for common lateral movements in opposite directions and including a horizontally disposed mounting shaft, a tubular bearing sleeve mounted for compound pivotal and sliding movements on the intermediate portion of said mounting shaft, a depending leg structure between said bearing sleeve and said shoes, and coil tension springs yieldingly biasing said shoes toward a point centrally of said mouth but permitting transverse movements of said shoes to compensate for lateral variations between the path of travel of said chopper and the line defined by the stalk plants of a given row.

3. The structure defined in claim 2 in further combination with roller means carried by said leg structure intermediate said bearing sleeve and said shoes and engageable with the lower edge portion of said hood when said shoes are in their operative position.

References Cited in the file of this patent

UNITED STATES PATENTS

| | | |
|---|---|---|
| 1,847,234 | Braden | Mar. 1, 1932 |
| 2,210,341 | Rund | Aug. 6, 1940 |
| 2,648,941 | Hintz | Aug. 18, 1953 |
| 2,725,704 | Skromme | Dec. 6, 1955 |
| 2,862,345 | Wigham | Dec. 2, 1958 |
| 2,880,561 | Lundell | Apr. 7, 1959 |
| 2,970,420 | Schmidt | Feb. 7, 1961 |